April 2, 1935.  I. B. LESLIE  1,996,727
NUT LOCK
Filed Jan. 20, 1934
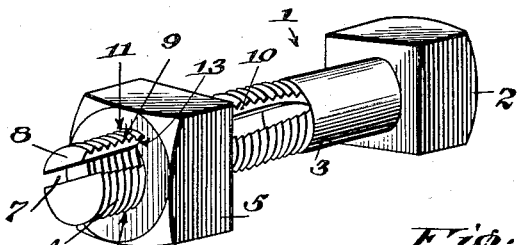
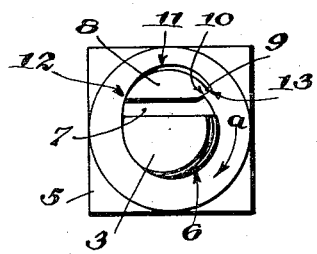
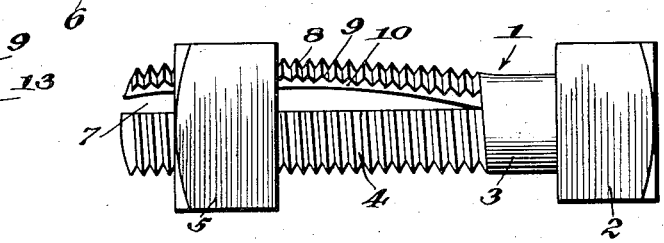
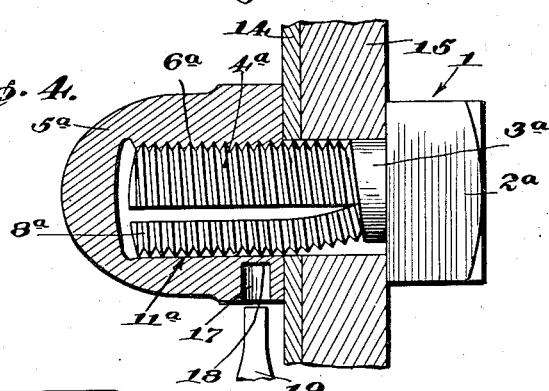
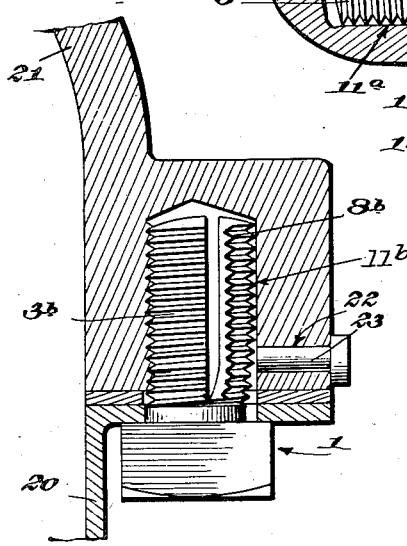
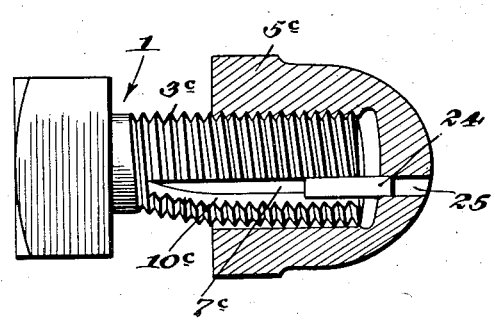
WITNESSES
INVENTOR
Irvine B. Leslie,
BY
ATTORNEYS Patented Apr. 2, 1935

1,996,727

UNITED STATES PATENT OFFICE 1,996,727

NUT LOCK

Irvine B. Leslie, Newberry, S. C., assignor to Gordon S. Leslie, Newberry, S. C.

Application January 20, 1934, Serial No. 707,596

8 Claims. (Cl. 151—31)

This invention relates to improvements in nut locks and self-locking screws, and its objects are as follows:—

First, to provide the threaded end of the bolt with an off-center slot running lengthwise of the bolt shank so as to produce what is herein called a spring tongue, the function of this spring tongue being to snap into a cam recess in the nut upon turning the nut in one direction, said recess having a shoulder which is adapted to abut the spring tongue and prevent relative turning of the nut and bolt in the opposite directions.

Second, to bevel the trailing edge of the spring tongue and to correspondingly undercut the shoulder so that when an attempt is made at unscrewing either the bolt or nut the bevel and undercut will move together more firmly with a wedge action to make the connection of the nut and bolt more tight than before.

Third, to provide a closed nut for use in conjunction with the bolt so as to prevent pressing the spring tongue against the bolt for the purpose of clearing the cam recess, said nut having provision, however, for enabling compression of the spring tongue as fully brought out below.

Fourth, to use the foregoing bolt in conjunction with a closed threaded bore which may comprise either a closed nut or some other mechanical part, provision being again made for compressing the tongue so as to clear the cam recess when unscrewing the bolt.

Fifth, to use a key of some sort in conjunction with the bolt and nut when once screwed home, so as to permanently expand the spring tongue in the cam recess and prevent separation of the nut and bolt without actually twisting one off of the other.

In the drawing:—

Figure 1 is a perspective view of the improved nut lock, particularly showing the relationship of the spring tongue of the bolt to the cam recess in the nut.

Figure 2 is a front elevation of the bolt and nut.

Figure 3 is a detail side elevation.

Figure 4 is a sectional view showing the closed type of nut, this particular arrangement being especially adapted for securing a license plate on a bracket.

Figure 5 illustrates the use of the bolt in securing the oil pan to a crank case, the principle involved here being similar to that of Figure 4.

Figure 6 is a view on the order of Figure 4, illustrating the use of a driven key for the purpose of permanently wedging the spring tongue in the cam recess.

The underlying purpose of the invention is to provide an effective nut lock or self-locking screw, in which the utmost simplicity of construction has been observed so that standard bolts and nuts can easily be modified according to the principle of the invention and converted into highly efficient devices for the underlying purpose. The main object sought to be attained is a permanent connection of the nut with its bolt, or the bolt with some other part into which it has been screwed, said connection being proof against jarring loose and against disconnection until some other means has been brought into play for aiding the disconnection.

With this principle in mind the invention is particularly well adapted to securing a license plate to a bracket, but according to another principle of the invention the nut and bolt have provision for establishing a permanent connection which can be broken only by destroying either the bolt or nut beyond further use.

All this will be made clear from the drawing. In Figure 1 the bolt generally designated 1 is of original construction insofar as its head 2, shank 3 and threads 4 are concerned. This is also true of the nut 5 and its threaded bore 6. The nut 5 takes various forms, and for the purpose of identifying it with a broad designation it is later called the member into which the bolt is screwed.

In modifying the bolt 1 according to the invention the shank 3 is slotted at 7 lengthwise and off-center. The slot may extend as far as particular conditions may demand either part way of the length of the shank or all the way. This is controlled mainly by the amount of threads 4, because generally the slot 7 goes as far as the threads. This slot produces a tongue 8 which has a material degree of springiness because it is so much thinner than the remainder of the shank 3.

Its springiness is increased by bowing or bending it in the original manufacture by moving an implement of a suitable sort along the slot 7. This gives the tongue a sort of a flare as suggested in Figures 3 to 6, and the resulting offset from the main part of the shank is the chief aid to urging the tongue into locking engagement with the nut 5. The trailing edge 9 of the tongue 8 is bevelled at 10. The trailing edge is so-called because this particular bolt is predicated on a right hand thread.

Referring now to the nut, its bore 6 is recessed at 11. The recess is eccentrically disposed with respect to the bore so that it constitutes a cam recess. The point of mergence 12 of the recess 11 with the bore 6 is actually a cam which compresses the spring tongue 8 once in every turn of the nut 5 in the clockwise direction (arrow a). The recess 11 ends at a shoulder 13. This is undercut as plainly shown in Figure 2, in other words is not radial to the axial center of the nut.

The bevel 10 corresponds with the undercut and the result is that the two surfaces match when permitted to contact. Such contact occurs particularly when attempting to turn the nut 5 counter-clockwise. In such a case the two surfaces will ride against each other with a cam action, driving the trailing edge 9 deeper into the recess 11 at the shoulder 13, and making a more firm connection between the spring tongue 8 and nut 5 than if the particular arrangement of the bevel and undercut had not been adopted.

Thus far it will be understood that as long as the nut or the bolt is turned in the right direction the spring tongue 8 will snap into the recess 11 at every turn. As the turn in that direction continues the cam 12 will compress the spring tongue. Inasmuch as the spring tongue snaps into the recess once every turn it follows that a reverse turn will drive the spring tongue hard against the shoulder 13 as has already been brought out. In such forms of the nut lock as in Figures 1, 2 and 3 where the spring tongue 8 remains exposed, said spring tongue is readily compressed by means of pinchers or some other appropriate implement when it is desired to remove the nut. But in the other forms of the device such an expedient is not intended.

In Figure 4 the bolt 3ª is to be considered identical with the bolt in Figure 3 in all respects excepting the unimportant difference in length. The bolt is made considerably shorter here to suit the requirements of affixing the license plate 14 to the bracket 15. It is to be understood that this type of bolt and nut can be used for other purposes, the one use being given merely for illustration.

The nut 5ª is now of the closed type, that is to say, the end of the nut is not open as in Figures 1, 2 and 3. But this nut has a cam recess 11ª which if viewed in cross section would be identical in formation to the showing in Figure 2. It is readily seen that having screwed the nut 5ª home there would be no way of subsequently removing it from the bolt other than by cutting or mutilation, so in order to enable removal the nut is made with a hole 17 very close to its base and almost all the way through into the cam recess, only a very thin wall 18 remaining.

Now upon desiring to remove the nut a suitable implement 19 is inserted in the hole 17 and driven against the wall 18 until the latter is broken down. The point of the implement, and the intervening thin wall, compress the spring tongue out of engagement with the shoulder (equivalent to 13, Fig. 2), restoring the bore 6ª to the normal dimension at this point, and superseding the cam recess 11ª as long as the implement remains in the hole. The bolt 3ª can then be unscrewed or, what is the same thing, the nut 5ª can be backed off.

This principle is carried forward into Figure 5 which illustrates the use of the bolt 3ᵇ for securing an oil pan 20 to a crank case 21. Both here and in Figure 4 the member into which the bolt is screwed is to be identified with the original nut 5. The threaded bore has a cam recess 11ᵇ as in the other two instances, and since the spring tongue 8ᵇ is intended to snap into this, removal is impossible until a suitable implement is thrust into a hole 22 for the purpose of compressing the spring tongue and enabling unscrewing the bolt. Ordinarily this hole is plugged up with a headed rivet 23 or the like.

Figure 6 illustrates a modification according to which use is made of a key 24 for the purpose of making a permanent connection between the bolt 3ᶜ and nut 5ᶜ. The nut and bolt are to be regarded as the same nut and bolt shown in Figure 4. The section is taken the other way around, and therefore reveals the bevel 10ᶜ which would not show in Figure 4. The nut 5ᶜ is provided with one or more apertures 25, intended to register with the slot 7ᶜ, and when the nut is finally screwed home the key 24 is inserted and driven into the slot 7ᶜ as far as desired, a portion of it remaining in the aperture 25. It is readily seen that neither the nut nor the bolt can be unscrewed with respect to the other without mutilation to the point of destruction.

The foregoing description is predicated on the use of a single off-center slot in the bolt shank. This will be adhered to in most instances so as to retain the advantage of the relatively large expanse of thread surface on the stiff part of the bolt shank. But it is possible to slot the shank with parallel slots, each off-center, to produce two spring tongues. In an instance such as this the nut can be provided with two cam recesses diametrically opposite from each other.

I claim:—

1. A nut lock comprising a threaded bolt shank having a longitudinal slot off-center with respect to the axis of the shank providing a tongue integral with the shank, said tongue being bowed substantially its entire length to constitute a spring tongue, and a member into which the bolt is screwed having a threaded bore to receive the shank and a recess in communication with the bore to receive the spring tongue, the point of mergence of the recess with the bore comprising a cam to depress the spring tongue upon turning the nut in one direction, the other end of the recess providing a shoulder abuttable by the tongue upon reversely turning the nut.

2. A nut lock comprising a threaded bolt shank having a longitudinal slot off-center with respect to the axis of the shank providing a tongue integral with the shank, said tongue being offset to constitute a spring tongue, and a member into which the bolt is screwed having a threaded bore to receive the shank and a recess in communication with the bore to receive the spring tongue, the point of mergence of the recess with the bore comprising a cam to depress the spring tongue upon relative turning the nut and member in one direction, the other end of the recess providing a shoulder abuttable by the tongue upon reverse relative turning, said abuttable part of the tongue being bevelled and the shoulder being correspondingly undercut to set up a wedge action upon said reverse turning.

3. A nut lock comprising a threaded bolt shank having an integral off-centered spring tongue with a bevelled trailing edge, and a nut having a threaded bore to screw on the shank, the bore having a cam recess into which the tongue is springable, said recess having an undercut shoulder adapted to receive said trailing edge and set up a wedge action upon a reverse turn of the nut.

4. A nut lock comprising a threaded bolt shank having an off-centered spring tongue, a closed nut having a threaded bore, said nut being screwed onto the shank to close off access to the end of the shank, said bore having at least one cam recess with a shoulder to receive the spring tongue and compose a lock.

5. A nut lock comprising a threaded bolt shank having an off-centered spring tongue, a closed nut having a threaded bore, said nut being screwed onto the shank to close off access to the end of the shank, said bore having a cam recess with a shoulder to receive the spring tongue and compose a lock, and means embodied in the nut enabling the compression of the spring tongue out of the recess so that the nut can be unscrewed from the bolt.

6. A nut lock comprising a threaded bolt shank having an off-centered spring tongue, a closed nut having a threaded bore, said nut being screwed onto the shank to close off access to the end of the shank, said bore having a cam recess with a shoulder to receive the spring tongue and compose a lock, said nut having a hole near its base leaving a thin wall between the hole and the cam recess, said wall being displaceable by driving in an implement to compress the spring tongue.

7. A device of the character described comprising a threaded bolt shank with an off-center spring tongue, and a member having a threaded bore into which the shank is screwed, said bore having a cam recess into which the spring tongue snaps upon turning the shank in one direction, the recess including a shoulder against which the tongue is abuttable upon reverse turning of the shank, said member having a hole for the insertion of an implement into the cam recess to compress the spring tongue out of the recess.

8. A nut lock comprising a threaded bolt shank having an off-centered slot producing a spring tongue, a nut having a threaded bore into which the shank is screwed, said bore having a cam recess into which the tongue snaps to make an interlock, and a key driven through the nut into the slot to permanently hold the tongue in the recess.

IRVINE B. LESLIE.